United States Patent Office 2,959,261
Patented Nov. 8, 1960

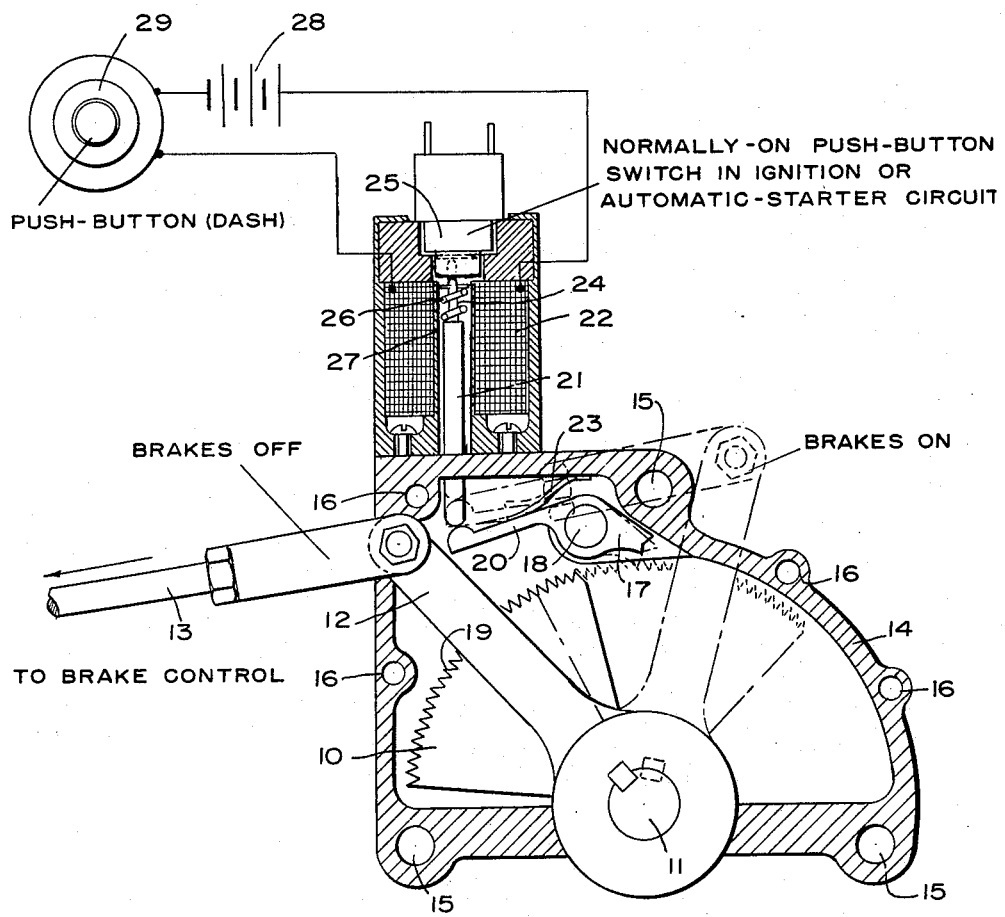

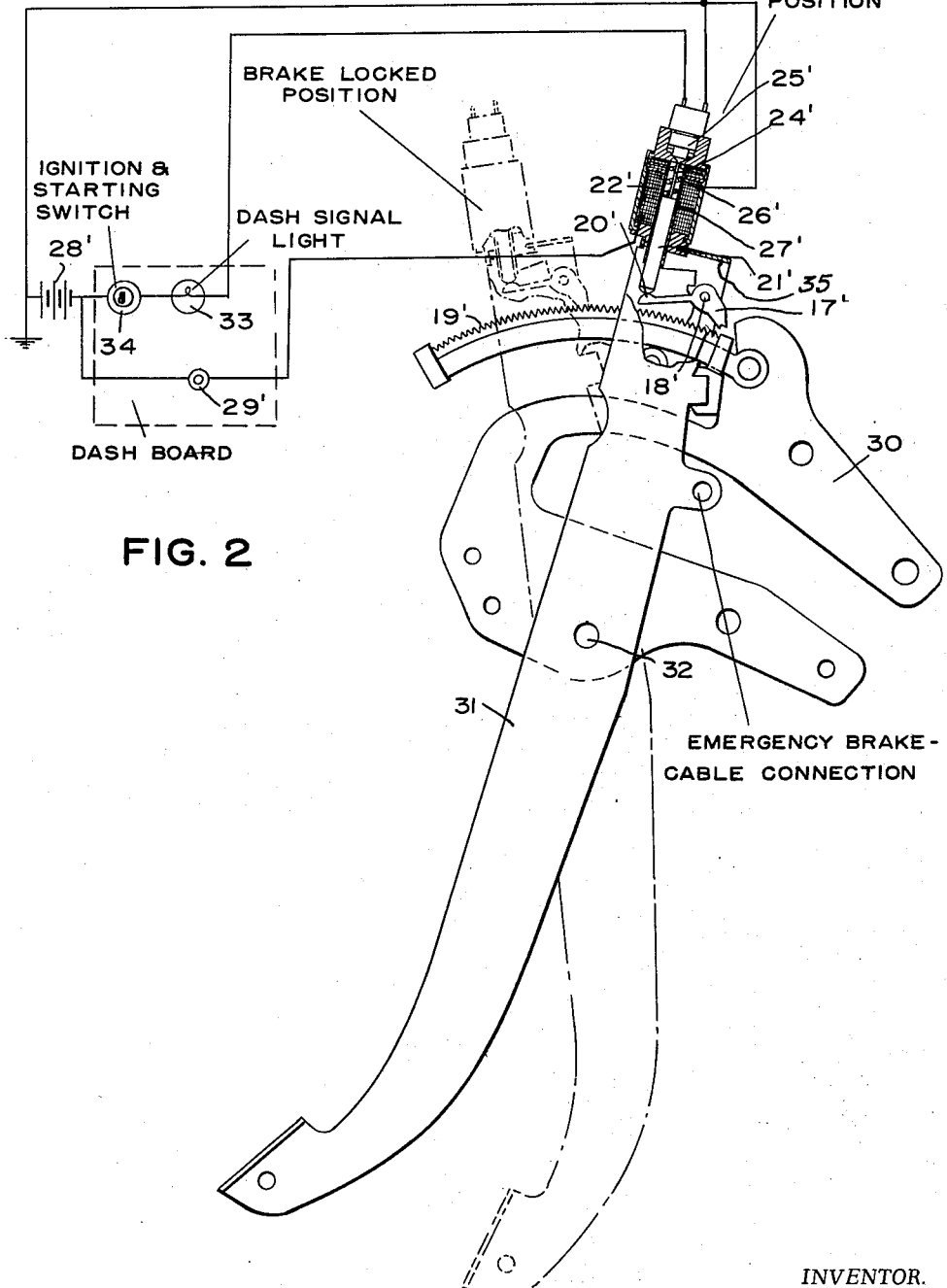

2,959,261
PARKING SAFETY DEVICE

Stanley R. Hemphill, La Mesa, Calif., assignor to Safety Automatic Brake Corporation, Denver, Colo., a corporation of Nevada Filed Sept. 16, 1957, Ser. No. 684,223

9 Claims. (Cl. 192—3)

This invention relates to parking safety devices for use in connection with brakes, whereby it is impossible to forget to set the brakes on when parking, or to do any one of a number of other precautionary things that should be done but may easily be forgotten either at the time when the car is left parked without an adult attendant or when starting out to drive the car after returning thereto.

The object of the present invention is to provide brake control ratchet means for locking the brake control in any position of operation when desired, means for automatically releasing said locking means by a little extra pressure on the control, and means operated by said locking means to automatically perform some other functions required before leaving the car safely parked.

A further object is to provide a pawl for the ratchet in the above ratchet means, which pawl is held in disengaged relation for normal service operation of said brake control, and means for temporarily biasing said pawl into engagement with said ratchet for parking operation of said brake control, so that the brake control may be locked in brake applied position and will remain locked until the brake control is again pressed to release said pawl into its disengaged relation, said biasing means simultaneously performing another required function, such as breaking the ignition or starter circuits, or operating a switch for any other purpose, which would otherwise have to be separately operated by the driver before leaving the parked car.

A further object is to use a solenoid means for biasing the above pawl into engagement with said ratchet and provide a switch easily accessible to the driver for controlling the energization of said solenoid, and a normally-on push-button switch connected in the primary ignition circuit and mounted for operation by said solenoid when energized, to operate as a means for automatically cutting off the engine when setting the brakes preparatory to leaving a parked car, so that the engine might not be left running by a forgetful driver before he leaves the car unattended, and also so that he will not forget to release the brakes before starting up, on his return, the ignition circuit being held broken by the push-button switch as long as the pawl is held in the ratchet of the brake control ratchet means.

A further object is to have the above push-button connected in the automatic starting circuit in cars equipped with such automatic starting, so that turning on the ignition switch will not start the engine until the brake control is released for service operation.

Other and more specific objects of this invention will become apparent as one form of device made in accordance therewith is described in detail, having reference to the accompanying drawing, wherein:

Fig. 1 illustrates a preferred form of a solenoid operated brake-control ratchet means and safety switch assembly, in transverse-sectional view through the ratchet casing and axially through the solenoid mounted thereon, and Fig. 2 shows an application of the device to an emergency brake which is operated by a foot pedal, the safety switch of which is of the normally-off type and is connected to a signal light on the dash for operation by the ignition and starting switch to signal the driver while starting, that the emergency brake has not been released.

It has been the experience of many drivers, that when parking their car they would sometimes forget to set the brakes or turn off the ignition, the lights, the radio, the levellizer circuit or any one or a number of other service circuits which are needed only when driving, and which may cause serious damage or unnecessary wear on the battery, when parked. Serious damage has resulted from cars left parked at the curb on a mildly inclined street without setting the brakes, to be accidentally started down the incline as by a gust of wind when the driver was not looking, and inevitably picking up considerable speed before crashing into something or running over somebody. Less serious damage has been known to occur to equipment in the car as a result of forgetting to turn off some circuit that is needed only during driving.

Another precaution often forgotten by drivers who do not forget to set their emergency brakes when parking, is to release them before starting off. They find it difficult to set the car in motion without applying a lot of extra power, but in many cases do not realize the trouble; that is, not until they try to use the emergency brakes again and find them ineffective, due obviously to the forced wear on the brake shoes at the expense of extra engine power that was required during the early part of the drive. The present device, when applied to the ignition circuit will ensure that the brake control is released for service operation even before the engine can be started, so that there is no chance to forget releasing the brakes before driving off. In this arrangement, of course, the safety switch used is of the normally-on push-button type and is connected in series in the ignition circuit. However, the safety switch may be of the normally-off push-button type and may be connected in series with a signal on the dash, to the dead side of the ignition and starting switch, so that it will operate the signal only when the ignition and starting switch is on, and will indicate by operation of the signal if the brake is set, but will not prevent starting the engine. Thus the driver will be warned to release the brakes before driving. The advantage of this arrangement is that the safety switch does not have to carry the load of the ignition circuit, and only infrequently carries the small load for the signal operation when the brakes are set, with the ignition turned on.

Referring now to Fig. 1 in the drawing, it will be seen that the device comprises a simple sectorial ratchet 10 fixed on a shaft 11 for operation by a brake control means (not shown), such as a foot pedal, for example. Shaft 11 may be connected to the foot pedal or other brake control means by a brake control arm 12 keyed to the shaft, and an adjustable link 13 pivotally connected between the end of this arm and the brake control means. Obviously, the shaft 11 could be a part of the brake control means, or directly coupled to one end of a foot pedal shaft, where the foot pedal has a shaft fixed to it.

The housing 14 is shown in transverse section and is provided with bores 15 for mounting bolts, and threaded bores 16 for mounting screws for an end cover for the housing. Said end cover is provided with a bearing slidably fitting over the shaft 11 to support the shaft on one side of ratchet 10, the shaft bearing on the other side of the ratchet being provided in the opposite wall of said housing. A suitable pawl 17 is freely rotatable on shaft 18 rigidly fixed in the housing, and is normally biased by gravity into engagement with the ratchet teeth 19. The pawl has a substantially light arm 20 preferably of magnetic material extending under the armature 21 of a solenoid 22 mounted on the housing, with the lower end of the armature 21 passing through the top of the housing. The gravitational bias of the pawl 17 may be supplemented by a resilient tension member 23 between the arm 20 and the housing 14 to provide a more positive engagement into the ratchet teeth when the armature is drawn up by energization of the solenoid.

The solenoid being energized, the armature 21 is drawn upward against the bias of spring 26 and the push-button of switch 25 and its magnetization provides an attractive force on the end of arm 20 to further supplement the bias of the pawl 17 into engagement with the ratchet teeth 19. The armature 21 has a pin 24 extending from its upper end to the safety push-button switch 25, for operation thereof when the armature is actuated by the solenoid and held in its actuated position by the ratchet should the brakes be set in the meantime, until the pawl is released by a little extra pressure on the brake control. The pawl then assumes its normal disengaged position, as shown in full lines in Fig. 1. The engaged position of the pawl is indicated in dotted lines in Fig. 1. In this figure, the arm 12 is shown in full lines in the brakes off position, and its assumed brakes on position is indicated in dot-and-dash lines.

The armature is normally held in its full line position as shown in Fig. 1 by the push button bias which may be supplemented by a return spring 26, the upper end of which is fixed to the solenoid sleeve 27 and the lower end is biased against the shoulder of the armature around the pin 24. Of course, the weight of the armature adds to this bias when the solenoid is used in the uprightly mounted position as shown in Fig. 1, and would have to be overcome by the bias of the push button and spring 26 if the device were installed so that the solenoid would be reversed, with the safety push-button switch at the lower end of the solenoid and the armature normally biased upwardly thereby and by the spring 26, if used. To meet all requirements of service in various installations where this device might be applied, it is necessary to provide sufficient spring bias to overcome the effects of gravity even if the device were mounted in vertically reversed position from that shown. The effect of tension spring 23, if used, also has to be considered as adding to this gravity effect in such reversed position.

The solenoid 22 may be energized by a circuit connected to the car battery 28 and closed by operating a push-button switch 29 located conveniently for the driver, as e.g. on the dash in front of the steering wheel. This automatically cuts off the engine by operating the safety push-button switch 25. The safety push-button switch 25 may be of the normally-on type and may be connected in the ignition or starting circuit as a cut-off switch when actuated by the armature in its pawl-engaged position, and so that the car engine will not start unless the pawl is released. It will be observed that the pawl, even though biased toward the out of engagement position, can only be released out of engagement by increasing the pressure on the brake control arm prior to releasing the brakes. Once the brakes have been set and locked by operation of the dash push-button 29, the armature 21 is held in raised position by the pawl being held in engagement with the ratchet, due to the angle of the engaging tooth surfaces, which is such that it tends to bias the pawl tooth inwardly of the ratchet to provide a positive lock against release of the pawl out of engagement even after the pawl is biased toward such disengagement, until the brake operating pressure is increased on the arm to move the ratchet tooth free from the pawl tooth surface, as when preparing to release the brakes.

In an alternative arrangement, the safety switch, instead of being the normally-on type, may be of the normally-off type and connected, through a signal on the dash, in parallel with the ignition circuit, to the ignition and starting switch, so that when the ignition is turned on the signal will operate to warn the driver that the brakes are set, if the pawl is in engaged position. This arrangement is diagrammatically shown in Fig. 2.

Thus the safety switch is adaptable for connection to automatically provide a warning or perform a function in connection with some control that might otherwise be forgotten either when parking or starting up a car, bus, truck or other vehicle.

Thus far the device was described as having a movable ratchet and a stationary pawl mounting. However, the same relative motions between the parts could be obtained if the ratchet were fixed and the pawl mounting were connected to the brake control to move relative to the ratchet.

Such an arrangement is shown in Fig. 2 as applied to a foot pedal operated brake control, such as is used for the emergency brake operation on some of the more recent cars to replace the standard hand brake. These cars still use a hand operated release means for releasing this emergency brake.

The arcuate ratchet 19' is rigidly fixed to the mounting bracket 30 near the upper end of the foot pedal lever 31 concentrically with its pivot shaft 32 which is fixed to the mounting bracket 30, and the pawl 17' is mounted for oscillation about shaft 18' fixed in lever 31. This pawl may be similarly constructed and operated by solenoid assembly, similar to that shown in Fig. 1 and mounted rigidly on a flange 35 on the end of lever 31, the similar parts being indicated by primed corresponding numerals. The safety push-button switch in Fig. 2, however, illustrates a normally-off type of switch adapted for connection through a signal light 33 to the ignition and starting switch 34, in parallel with the ignition and starting circuits, so that it will not prevent starting the engine nor carry the load of the ignition or starting circuits, but will merely flash the signal light on should the pawl be in engagement with the ratchet, and until it is released therefrom by an additional pressure on the brake control pedal.

The spring 26 may be entirely omitted and the weight of the armature relied on for biasing the pawl 17 into operative position, for some specific applications; the resilient member 23 may also be omitted, and the magnetic attraction between the armature 21 and the pawl arm 20 relied on for biasing the pawl into operative relation with the ratchet when the solenoid is energized. For general purposes, however, when the device might be mounted in any angular position with respect to gravity, a simple flat spring mounted in the housing 14 and extending into the side of the lower end of the armature 21 for biasing it into pawl disengaged position, would be a practical way to assure that the armature would not stick in operative position due to gravity or frictional effects in any positions of installation of the device, when the solenoid is de-energized.

It is also within the purview of this invention that the safety switch 25 could be any other type than a push-button, and could be positioned inside the housing 14. For example, it might have a pair of flat spring arms for its contacts, one of which might extend into the path of arm 20 or the lower end of the armature 21 for operation in either direction either to close or to open the contacts, as may be desired.

Many other obvious modifications in the details and arrangement of parts of this device may be made without departing from the spirit and scope of the present invention, as defined in the appended claims.

What is claimed is:

1. In an automobile brake control system, a manually operated pivoted brake control lever means mounted on support means, said lever being normally biased about its fulcrum toward brakes-released position to serve as a service brake lever, a pawl and ratchet operatively connected to said brake control lever and support to lock said control lever against said bias when desired, as for parking in any brake-setting position, said pawl being pivotally mounted on one of said means adjacent said ratchet on the other means and lightly biased to pivot into ratchet engaging position, a solenoid mounted on said pawl support means and having a protruding armature pin spring-pressed against said pawl in opposition to said light bias, to hold said pawl out of engagement with said ratchet when the solenoid is not energized during normal driving operations and to retract from said pawl when the solenoid is energized, said pawl and ratchet having engaging teeth formed at an angle such as to retain said pawl in engagement with said ratchet, even after said solenoid is deenergized, by reason of the normal bias of the brake control lever until said bias is overcome by manual pressure on said lever, and a solenoid energizing circuit for said solenoid, including a push-button control swtich to energize said solenoid when parking.

2. The combination defined in claim 1, wherein said ratchet is arcuate about the fulcrum of said brake control lever.

3. The combination defined in claim 2, where said ratchet is fixed to said brake control lever.

4. The combination defined in claim 2, wherein said ratchet is stationary and said pawl and solenoid are mounted on said brake control lever.

5. The combination defined in claim 1, and a push button switch mounted on said solenoid so as to be operated automatically by the armature pin in response to energiaztion of said solenoid.

6. The combination defined in claim 5, wherein said push button switch on said solenoid is a normally-on switch adapted for connection in the ignition circuit of said automobile.

7. The combination defined in claim 5, wherein said push button switch on said solenoid is a normally-on switch adapted for connection in the starter circuit of said automobile.

8. The combination denfied in claim 5, and a dash signal light adapted for connection to said solenoid operated switch, through the ignition switch of the automobile.

9. The combination defined in claim 5, and a dashed signal light adapted for connection to said solenoid operated switch through the ignition and starter switch of the automobile.

References Cited in the file of this patent

UNITED STATES PATENTS

| | | |
|---|---|---|
| 1,972,300 | Hemingway | Sept. 4, 1934 |
| 2,140,780 | Wimmer | Dec. 20, 1938 |
| 2,405,956 | Jandus | Aug. 20, 1946 |
| 2,499,276 | Mullins et al. | Feb. 28, 1950 |
| 2,532,357 | Callender et al. | Dec. 5, 1950 |
| 2,751,054 | Del Re | June 19, 1956 |
| 2,821,275 | Martin | Jan. 28, 1958 |

FOREIGN PATENTS

| | | |
|---|---|---|
| 839,158 | Germany | May 15, 1952 |